United States Patent
Buchi et al.

[15] 3,694,466
[45] Sept. 26, 1972

[54] PROCESS FOR THE PREPARATION OF 2,5-DIMETHYL-4,5-DIHYDROFURAN-3-OL-4-ONE

[72] Inventors: George H. Buchi, 100 Memorial Drive, Cambridge, Mass. 02142; Edouard Demole, 100, rte de Chancy, Geneva, Switzerland; Albert Eschenmoser, 9, Bergstrasse, Kusnacht, Zurich, Switzerland; Alan F. Thomas, 16, Ch. de l'Esplanade, Vernier, Geneva, Switzerland

[22] Filed: Feb. 19, 1970

[21] Appl. No.: 14,873

Related U.S. Application Data

[62] Division of Ser. No. 736,268, June 12, 1968, Pat. No. 3,558,714.

[30] Foreign Application Priority Data

June 16, 1967 Switzerland ............... 8620/67

[52] U.S. Cl. .............................................. 260/347.8
[51] Int. Cl. ................................................ C07d 5/10
[58] Field of Search ................................... 260/347.8

[56] References Cited

OTHER PUBLICATIONS

Paal, Berichte (1884) Vol. 17, p. 2756– 2767.
Dunlop et al., The Furans, New York, Reinhold Publ. Co. (1953) p. 35– 37.
Hoffman et al., Chem. Abstracts (1966) Vol. 65, 2194f.

*Primary Examiner*—Alex Mazel
*Assistant Examiner*—Bernard I. Dentz
*Attorney*—Pennie, Edmonds, Morton, Taylor and Adams

[57] ABSTRACT

2,5-dimethyl-4,5-dihydrofuran-3-ol-4-one is prepared by catalytic cyclisation of hexane-3,4-diol-2,5-dione.

6 Claims, No Drawings

PROCESS FOR THE PREPARATION OF 2,5-DIMETHYL-4,5-DIHYDROFURAN-3-OL-4-ONE

This application is a division of our application Ser. No. 736,268, filed June 12, 1968 now U.S. Pat. No. 3,558,174.

The present invention relates to a novel process for preparing 2,5-dimethyl-4,5-dihydrofuran-3-ol-4-one (hereinafter referred to as furan derivative) which possesses valuable organoleptic properties and is, therefore, useful as a flavoring agent for foods and beverages. The invention furthermore relates to a new intermediate used in the said novel process and to methods for preparing it.

A known method for preparing 2,5-dimethyl-4,5-dihydrofuran-3-ol-4-one consists in heating rhamnose in the presence of piperidine acetate [cf. Proc. Am. Soc. Brewing Chemists 84 (1963)]. The starting rhamnose is a relatively expensive natural product which can be obtained only in small insufficient quantities and which, therefore, is not a suitable starting material for the commercial production of the said dihydrofuran derivative.

Another known method for preparing 2,5-dimethyl-4,5-dihydrofuran-3-ol-4-one comprises hydrogenolyzing acetylformoin by treating the latter with hydrogen in the presence of a palladium-carbon catalyst and purifying the crude product by chromatography on silica [cf.Helv.Chim.Acta 49, 53 (1966)]. The yield of pure product is only about 10 percent of the theory.

A further known method for preparing 2,5-dimethyl-4,5-dihydrofuran-3-ol-4-one consists in catalytically hydrogenating 2,5-dihydroxymethyl-3,4-dibenzoxyfuran [cf. J. Org. Chem. 31, 2391 (1966)]. The main disadvantage of this method resides in the fact that the synthesis of the intermediate 2,5-dihydroxymethyl-3,4-dibenzoxyfuran requires four chemical steps. Furthermore, the overall yield of the desired product amounts to about 6.5 percent of the theory only.

The known methods described above are non-economical laboratory methods which cannot be applied to the production of the said dihydrofuran derivative on a commercial scale. It has now been found that the furan derivative can be obtained easily and economically from new intermediates which are derived from cheap starting materials available commercially in unlimited quantities.

The process according to the invention comprises cyclizing hexane-3,4-diol-2,5-dione, which is a new compound, in the presence of a cyclization catalyst.

Cyclization catalysts such as salts of organic carboxylic acids with organic nitrogen bases can be used. Suitable organic acids include, e.g., formic, acetic, propionic, malonic, maleic, tartaric and citric acid. Suitable organic bases include e.g. piperidine, dimethyl-piperidine, piperazine, picoline, morpholine or pyrrolidine. A preferred cyclization catalyst is piperidine acetate. Alkali metal salts of mineral acids can also be used as cyclization catalysts. These salts include the so-called "neutral" salts which normally result from the complete neutralization by a metalic base of all the acidic functions of a polybasic acid and the so-called "acid" salts which normally result from the complete neutralization of the acidic functions of a polybasic acid. The salts which can be used for the cyclization include the "neutral" or "acid" salts of sodium, potassium, or lithium with sulphuric, carbonic, phosphoric or boric acid, e.g., sodium sulphate, sodium bisulphate, sodium carbonate, sodium bicarbonate, sodium orthophosphate, sodium monohydrogenphosphate, sodium dihydrogenphosphate or sodium borate. Mixtures of such salts can also be used as catalysts for the cyclization. Preferred catalysts of this type are sodium carbonate or bicarbonate, or mixtures of sodium orthophosphate, monohydrogenphosphate and dihydrogenphosphate.

The pH of the cyclization medium should preferably not be strongly acid or alkaline. A suitable pH range may vary from approximately 6–6.5 to approximately 9. The cyclization can be performed outside of these pH limits, but with too acidic conditions the cyclization is very slow and with too alkaline conditions the yields are normally very low. The exact pH actually depends on the catalyst selected, but generally optimum results are obtained when media with a pH of about 7–8 are used.

The cyclization can be performed in water or in a mixture of water with a water-miscible solvent, such as methanol, ethanol, dioxan, tetrahydrofuran or dimethoxyethane. Pure water is the preferred solvent. The cyclization can be performed at temperatures comprised between 20° and 150°C. but preferably at the reflux temperature of the reaction mixture under nitrogen or $CO_2$.

According to the invention hexane-3,4-diol-2,5-dione, the cyclization gives the furan derivative, can be obtained by the reduction of pyruvaldehyde according to the following scheme:

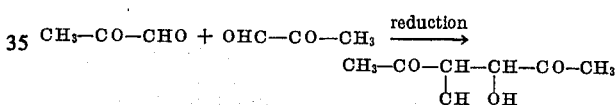

The reduction can be carried out by means of common reducing agents, e.g., stannous chloride, sodium formaldehyde sulphoxylate of chipped or powdered metals, such as tin, zinc, cadmium or iron, in the presence of hydrochloric, sulphuric or acetic acid. Zinc powder together with acetic acid is a preferred reducing agent.

The reduction can be carried out in hydroxylic solvents, such as methanol, ethanol, isopropanol or preferably water, at temperatures between 20° and 100°C. preferably at about 40°–50°C.

According to the invention hexane-3,4-diol-2,5-dione can also be prepared by a catalytic oxidation of 2,5-dimethyl-2,5-dimethoxy-3,4-dihydrofuran [obtained according to Bull. Soc. Chim. France 997 (1957)] according to the following scheme:

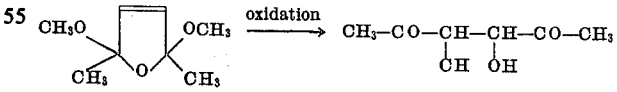

The above oxidation can be performed in a mixture of water with a water-miscible solvent, e.g. tetrahydrofuran, dioxan or dimethoxyethane at temperatures comprised between 20° and 80°C. A mixture of water and tetrahydrofuran and a temperature of 45°–50°C. are preferably used. Oxidizing agents such as sodium bichromate, sodium permanganate, potassium perchlorate or potassium chlorate can be used. Potassium chlorate is preferably used together with osmium tetroxide as an oxidation catalyst.

According to the invention hexane-3,4-diol-2,5-dione can also be prepared by oxidizing acetol by means of an air stream in a buffered aqueous solution. The oxidation can be carried out at temperatures ranging from 40° to about 150°C. At the higher temperatures of this range pressure must be used for carrying out the oxidation. Operating at about 90°C. at a pH comprised between 5 and 6 is preferred.

The invention is further illustrated by the following examples wherein temperatures are given in centigrade degrees.

EXAMPLE 1

Preparation of 2,5-dimethyl-4,5-dihydrofuran-3-ol-4-one
a–1. Hexane-3,4-diol-2,5-dione A mixture of 680 g. of pyruvic aldehyde in the form of a 50 percent aqueous solution, 680 g. of ethanol and 500 g. of glacial acetic acid were heated to 45°, while stirring vigorously under nitrogen. Then 600 g. of powdered zinc were added portionwise within 1½ hours, the temperature being maintained between 45° and 60°. The solution was filtered, conconcentrated in vacuo, and the residue was taken up in 500 ml. of warm ethyl acetate. The organic solution was filtered, and concentration in vacuo caused the crystallization of 336 g. of crude product which was then purified by recrystallization from ethyl acetate or by sublimation. The pure hexane-3,4-diol-2,5-dione melted at 89°–90°.

a–2. Hexane-3,4-diol-2,5-dione

A mixture of 625 g. of a 40 percent aqueous solution of pyruvic aldehyde, 815 ml. of water and 185 g. of pure acetic acid were heated to 40°–50°, with vigorous stirring and under nitrogen. 220 g. of powdered zinc were then introduced portionwise, while maintaining the temperature between 40° to 50°. The addition took about 3 hours, whereupon the mixture was further stirred for 2 hours at room temperature. The unreacted metallic zinc was filtered, the filtrate concentrated in vacuo at 35°–40°, the zinc acetate was separated by filtration and the filtrate diluted with 2 l. of water. It was then proceeded to a continuous extraction with a mixture of ether-petroleum ether (b.p. 30°–50°), 2 : 1 (v/v), over a period of 1 week, then with a mixture 9:1 (v/v) over a period of another week. After removal of the volatile solvents the extracts yielded 198.5 g. (80 percent) of crude hexane-3,4-diol-2,5-dione which crystallized in the cold, and it was possible to use it directly for the next cyclization step.

b. Cyclization of hexane-3,4-diol-2,5-dione

A solution of piperidine acetate was prepared by adding 1.49 g. of acetic acid and then dropwise 1.2 ml. of piperidine to 17 ml. of water, the temperature being maintained below or at 20°. Then 2.85 g. of hexane-3,4-diol-2,5-dione prepared according to the method described in paragraphs a–1 or a–2 above were added under nitrogen. It was refluxed for 1 week under nitrogen and then neutralized between 0° and 10° by means of a 4 percent aqueous NaOH solution. It was continuously extracted with ether overnight. After the usual drying and concentrating operations the ethereal extract yielded 1.85 g. of crude furan derivative. By sublimation under a high vacuum (bath temperature 80°) there were obtained 1.34 g. of sublimated product which was washed twice with a small amount of petroleum ether. There were thus obtained 1.27 g. (51 percent) of furan derivative, m.p. 77°–79°, whose purity was confirmed by thin layer chromatography or by gas-chromatography.

EXAMPLE 2

Preparation of 2,5-dimethyl-4,5-dihydrofuran-3-ol-4-one
a. Hexane-3,4-diol-2,5-dione A solution containing 7.16 g. (45.2 millimoles) of 2,5-dimethyl-2,5-dimethoxy-dihydrofuran, 7.9 g. (64.5 millimoles) of potassium chlorate, 0.25 g. (1.0 millimole) of osmium tetroxide, 50 ml. of tetrahydrofuran and 100 ml. of water was heated for 18 hours at 45°–50°. The solution was concentrated to dryness in vacuo and the residue was extracted with ethyl acetate. The organic extracts were filtered, dried over $Na_2SO_4$ and, on concentration, yielded 6.9 g. of crude product which was directly used for the next cyclization step. By crystallization from a mixture of $CHCl_3$ and $CCl_4$ or from methylene chloride there was obtained the analytical sample having the following spectral properties: IR, $\theta_{C=O}=$ 1710 $cm^{-1}$ ($CHCl_3$), MNR, $\delta$ = 2.25 ppm, 6 H, s; 4.25 ppm, 2 H, s; 4.37 ppm, 2 H, s. Melting point: 58°–60°.

b. Cyclization of hexane-3,4-diol-2,5-dione

A solution containing 5.4 g. of hexane-3,4-diol-2,5-dione prepared according to the method described in paragraph (a) above, in 100 ml. of a solution saturated with sodium bicarbonate was subjected to a continuous extraction with n-pentane over a period of one week and then with ether containing 10–15 percent of pentane (v/v) equally over a period of one week. After the usual treatment the combined extracts yielded 2.24 g. (51 percent) of furan derivative which was purified by sublimation according to the method of Example 1. MNR spectrum ($CDCl_3$) $\delta$ = 1.45 ppm, 3 H, d; 2.30 ppm, 3 H, s; 4.55 ppm, 1 H, quartet; 7.65 ppm, 1 H, s.

EXAMPLE 3

Preparation of 2,5-dimethyl-4,5-dihydrofuran-3-ol-4-one
a. Hexane-3,4-diol-2,5-dione A solution containing 22 g. of hydrate sodium acetate, 0.67 g. of sulphuric acid, 200 ml. of water and 72.6 g. of acetol was heated to 90°, and there was passed through the solution over a period of 70 hours a current of air divided into fine bubbles. The solution was concentrated to dryness in vacuo, taken up in 200 ml. of water and continuously extracted for 50 hours with ether containing 10 percent (v/v) of petroleum ether (b.p. 30°–50°). The usual treatment of the extract yielded 13.9 g. of crude product. It was possible to use it directly for the next cyclization step.

b. Cyclization of hexane-3,4-diol-2,5-dione

A solution containing 10 g. of hexane-3,4-diol-2,5-dione, prepared according to the method described in paragraph (a) above, dissolved in 100 ml. of a molar aqueous solution of trisodium phosphate was prepared. 20 ml. of a molar solution of disodium monohydrogenphosphate were added. The pH of the resulting solution was adjusted to 8–8.2 by the addition of a molar solution of orthophosphoric acid (about 70–80 ml.) and the whole was heated for 24 hours at 75°. It was then continuously extracted for 24 hours with a mixture 1:1 (v/v) of ether and petroleum ether (b.p. 30°–50°). By means of the usual concentration technique the extract yielded the practically pure furan derivative according to an MNR analysis (yield 55–60 percent).

We claim:

1. A process for the preparation of 2,5-dimethyl-4,5-dihydrofuran-3-ol-4-one which comprises cyclizing hexane-3,4-diol-2,5-dione in the presence of a cyclization catalyst selected from the group consisting of a salt of an organic carboxylic acid with an organic nitrogen base, an alkali metal salt of a polybasic mineral acid, and mixtures thereof at a pH of approximately 6 to approximately 9.

2. Process according to claim 1 which comprises using as a cyclization catalyst a salt of an organic carboxylic acid with an organic nitrogen base.

3. Process according to claim 2 which comprises using piperidine acetate as a cyclization catalyst.

4. Process according to claim 1 which using, as a cyclization catalyst, an alkali metal salt of a polybasic mineral acid.

5. Process according to claim 1 which comprises using, as a cyclization catalyst, sodium carbonate, sodium bicarbonate or a mixture of sodium orthophosphate, monohydrogenphosphate and dihydrogenphosphate.

6. Process according to claim 1, which comprises carrying out the cyclization in water at a pH comprised between 6 and 9 and at reflux temperature.

* * * * *